United States Patent [19]

Allen et al.

[11] 3,926,760

[45] Dec. 16, 1975

[54] PROCESS FOR ELECTROPHORETIC DEPOSITION OF POLYMER

[75] Inventors: James S. Allen, Wilmington, Del.; John D. Craig, Jr., Medford Lakes, N.J.

[73] Assignee: E. I. Du Pont de Nemours & Company, Wilmington, Del.

[22] Filed: Sept. 28, 1973

[21] Appl. No.: 403,264

[52] U.S. Cl. .............................................. 204/181
[51] Int. Cl.² ................... C25D 13/06; C25D 13/12
[58] Field of Search ................................... 204/181

[56] References Cited
UNITED STATES PATENTS

| | | | |
|---|---|---|---|
| 3,520,789 | 7/1970 | Lemmon | 204/181 |
| 3,682,814 | 8/1972 | Gilchrist | 204/181 |
| 3,809,634 | 5/1974 | Brown et al. | 204/181 |
| 3,855,106 | 12/1974 | Campbell et al. | 204/181 |

*Primary Examiner*—Howard S. Williams

[57] ABSTRACT

An improved process for electrophoretically coating polymer on an electrode comprising maintaining the electrode that is being coated with polymer at a temperature at least above that of the continuous phase for a time that is sufficient to produce a polymer film coating the electrode, that after baking at a temperature and for a time that is sufficient to harden the film, has a greater resistivity than a film that is coated under the same conditions with the exception that an elevated temperature is not maintained.

24 Claims, No Drawings

PROCESS FOR ELECTROPHORETIC DEPOSITION OF POLYMER

BACKGROUND OF THE INVENTION

This invention relates to a process of coating, by electrophoretic process, a film-forming polymer on an electrode. If such process is used with a polymer having a glass transition temperature of at least about 25°C., less than entirely satisfactory results can be obtained. This is especially so when an electrode such as aluminum or aluminum alloy is used that evolves gas during the electrophoretic process. In such situation the evolution of gas at the electrode often causes cracks, blisters, a non-continuous and non-uniform surface in the film and a film that has poor resistivity or dielectric strength. This is especially so also when the electrophoretic process is used to patch defects, such as cuts, scratches, etc. that exist in a film that covers a suitable substrate such as wire. In such a situation often the defects are not acceptably patched by the electrophoric deposition of polymer since such deposited polymer may not flow out sufficiently or be coalesced sufficiently. Furthermore, the patched areas may have poor resistivity or dielectric strength.

SUMMARY OF THE INVENTION

According to the present invention, there is provided:

In the process of coating, by electrophoretic process, a film-forming polymer on an electrode and using in the process, a composition that comprises a continuous phase containing polymer, the improvement comprising:
  a. using a polymer that
    1. has a glass transition temperature of at least 25°C., and
    2. is capable of being coated onto a suitable substrate by electrophoretic process,
  b. using a continuous phase comprising water and at least one organic liquid, said organic liquid
    1. having a solubility parameter of about 8.5 to 16,
    2. having such solvency that it will at least swell the polymer described in (a), and
    3. being present in an amount of about 1–13 parts by weight organic liquid per part by weight of polymer, and
  c. maintaining the electrode that is being coated with polymer at a temperature at least above that of the continuous phase for a time that is sufficient to produce a polymer film coating the electrode, that after baking at a temperature and for a time that is sufficient to harden the film, has a greater resistivity than a polymer film that is coated under the same conditions with the exception that an elevated temperature is not maintained.

If desired, the above-described compositions can contain thermosetting resin and/or polymer of tetrafluoroethylene and/or copolymer of tetrafluoroethylene/-hexafluoropropylene.

It has been found that the process of this invention overcomes the deficiencies mentioned previously under the heading Background of the Invention. That is, by use of the process of this invention, an electrodeposited polymer film is obtained, that after baking is substantially free of cracks and blisters, is substantially continuous and uniform and can exhibit a greater resistivity as compared to the same composition that is electrodeposited without the maintenance of elevated temperature.

DESCRIPTION OF THE INVENTION

Polymers

The polymers used in this invention should have a glass transition temperature of at least 25°C., preferably at least about 30°C. and most preferably at least about 35°C. Although it is quite difficult to place an upper limit on the glass transition temperature, at the present time, no benefit is seen in using a polymer that has a glass transition temperature of greater than about 350°C. and more preferably no greater than about 250°C.

The polymers used in the invention are capable of being coated onto a suitable substrate by electrophoretic process. This concept is well-known in the art and, therefore, will not be described in great detail. Generally, this means that the polymer will contain ionizable functionality, and/or polar functionality and/or will be used in conjunction with additives that will cause the polymer to be electrocoatable. Such additives, for example, can be substances that ionize and interact with and/or become associated with the polymer to thereby render them capable of being coated onto a suitable substrate by electrophoretic process. Preferably, the polymer will contain carboxylic functionality such as results from the incorporation in the polymer of monomer units of acrylic acid, methacrylic acid, itaconic acid, maleic anhydride, crotonic acid, and the like.

Preferably the polymers should have a molecular weight of at least about 1,000, preferably at least about 2,000, more preferably at least about 5,000, still more preferably at least about 30,000 and most preferably at least about 100,000. The upper limit of the molecular weight can be quite high, that is up to about 1 million, and even up to 2 million, 3 million or 5 million.

Many of the existing compositions useful for electrophoretic processes require that the polymer therein be neutralized with water-soluble amino compounds. See, for example, Gilchrist U.S. Pat. No. 3,230,162 issued Jan. 18, 1966, the disclosure of which is hereby incorporated by reference. However, the compositions used in the process of this invention do not require neutralization with a water-soluble amino compound. But even though such water-soluble amino compounds are not required, they may be used if desired without any detrimental effect.

Suitable polymers for use in this invention include polymers of unsaturated monomers, polyesters, polyurethanes, polyamides, polyester-imides, polyamic acids, polyamide-imides, epoxies, etc. and mixtures of the foregoing.

Suitable polyurethanes for use in this invention are those that are the reaction product of a polyisocyanate and an active hydrogen containing compound.

The polyisocyanate used is preferably toluene diisocyanate although other polyisocyanates such as m-phenylene diisocyanate, methylenebis(phenyl isocyanate), polymethylenepolyphenylisocyanate, tetramethylene diisocyanate, hexamethylene diisocyanate, and similar organic polyisocyanates may be used. The polyisocyanate also may be used in the form of a prepolymer which comprises the reaction product of an excess of the polyisocyanate and an active hydrogen containing compound.

Suitable active hydrogen containing compounds include polyols, hydroxyl containing polyester, hydroxyl containing polyethers, polyamines, and the condensation product of active hydrogen containing compounds and alkylene oxides.

Hydroxyl containing polyethers include, for example, polyethyleneether glycol, polypropyleneether glycol, polytetramethyleneether glycol, polyhexamethyleneether glycol, polyoctamethyleneether glycol, polynonamethyleneether glycol, polydecamethyleneether glycol, polydodecamethyleneether glycol and mixtures thereof. Polyethers containing several different radicals in the molecular chain such as, for example, the compounds

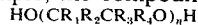

wherein $R_1$, $R_2$ and $R_3$ can be the same as each other or different than each other and can be H, alkyl such as methyl, ethyl or propyl, or aryl such as

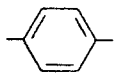

and wherein $n$ is greater than 1, can be used.

Hydroxyl containing polyesters which can be used instead of or in conjunction with the hydroxyl containing polyethers are, for example, those formed by reacting acids, esters or acid halides with glycols. Suitable glycols are polymethylene glycols such as ethylene, propylene, tetramethylene, decamethylene glycols, substituted polymethylene glycols, such as 2,2-dimethyl-1,3-propanediol and cyclic glycols such as cyclohexanediol. These glycols are reacted with aliphatic, cycloaliphatic or aromatic dicarboxylic acids or lower alkyl esters or ester forming derivatives thereof. Acids for preparing such polyesters are, for example, succinic, adipic, suberic, sebacic, terephthalic and hexahydroterephthalic acids and the alkyl and halogen substituted derivatives of these acids.

Suitable polyols include those glycols that are listed above for forming hydroxyl containing polyesters and polyols containing more than two hydroxyl groups per molecule such as 1,2,6-hexane triol.

Other active hydrogen containing compounds include sucrose, sorbitol, alpha-methyl glucose, manitol, erythritol and pentaerythritol.

Suitable polyamines include diethylene triamine, polypropylene glycol diamine, meta-phenylene diamine, methylene dianiline, methylene dicyclohexyl amine and oxydianiline.

Preferred active hydrogen containing compounds are the condensation products of alkylene oxides such as ethylene oxide, propylene oxide and the like with an active hydrogen containing compound. Expecially preferred are the condensation products of alkylene oxides with active hydrogen containing compounds such as glycerine, sorbitol, trimethylolpropane, ethylene diamine, sucrose, manitol, erythritol, pentaerythritol or alpha-methyl glucose.

The preferred epoxy resins for use in this invention are the complex epoxy-hydroxy polyethers which are obtained by the catalyzed condensation of polyhydric phenols or alcohols with an epoxy-contributing compound such as epihalohydrins and alkylene oxides as described in U.S. Pat. Nos. 2,456,408 and 2,592,560, the disclosures of which are hereby incorporated by reference. Typical polyhydric phenols include the mononuclear phenols such as resorcinol, catachol and hydroquinone and the polynuclear phenols such as bis-(4-hydroxyphenyl)methane, 2,2-bis-(4-hydroxyphenyl)propane (also known as bisphenol A) and 2,2-bis-(4-hydroxy-2-methylphenyl)propane. Typical polyhydric alcohols include ethylene glycols glycerine and trimethylol propane. Epichlorohydrin is the preferred epoxy-contributing compound.

Suitable polyesters are those above-mentioned that can be used in forming the polyurethanes.

Suitable polyamic-acids are disclosed in Edwards U.S. Pat. No. 3,179,614, the disclosure of which is hereby incorporated by reference.

Preferred polymers for use in this invention are polymers formed from ethylenically unsaturated monomers. Suitable ethylenically unsaturated monomers include amides, esters, and nitriles of acrylic acid, methacrylic acid, or ethacrylic acid. Examples of suitable ethylenically unsaturated monomers include esters of acrylic acid with alkanols having about 1 through 18 carbon atoms such as methyl acrylate, ethyl acrylate, propyl acrylate, isopropyl acrylate, the various butyl acrylates, cyclohexyl acrylate, 2-ethylhexyl acrylate, n-hexyl acrylate, n-octyl acrylate, t-octyl acrylate, decyl acrylate, isodecyl acrylate, lauryl acrylate, hexadecyl acrylate, octadecyl acrylate, and the like; esters of methacrylic acid with alkanols having about 1 through 18 carbon atoms such as methyl methacrylate, ethyl methacrylate, propyl methacrylate, isopropyl methacrylate, the various butyl methacrylates, cyclohexyl methacrylate, n-hexyl methacrylate, 2-ethylhexyl methacrylate, n-octyl methacrylate, t-octyl methacrylate, decyl methacrylate, isodecyl methacrylate, lauryl methacrylate, hexadecyl methacrylate, octadecyl methacrylate, and the like; vinyl esters of fatty acids having about 2 through 20 carbon atoms such as vinyl acetate, vinyl propionate, vinyl butyrate, vinyl valerate, vinyl hexanote, vinyl octonate, vinyl alpha,alphadimethyloctonate, vinyl oleate, vinyl laurate, vinyl palmitate, vinyl stearate and the like, 2-sulfoethyl methacrylate, acrylic acid, methacrylic acid, ethacrylic acid, itaconic acid, maleic anhydride, crotonic acid, alkyl acetic acid, vinyl sulfonic acid and the like, N,N-dimethylaminoethyl methacrylate, t-butylaminoethyl methacrylate, aminoethyl methacrylate, 4-vinyl pyridine, aminoethyl vinyl ether, acrylic acid or methacrylic acid that has been iminated, that is reacted with an alkylene imine such as ethylene imine or propylene imine, etc., styrene, chloroprene, vinyl chloride, vinylidene chloride, acrylonitrile, methacrylonitrile, ethacrylonitrile, butadiene, 1-butene, vinyl toluene, chlorostyrene, dichlorobutadiene, and the like. Mixtures of the foregoing can be used. The preferred monomers are the ones that have been underlined.

Preferred polymers formed from ethylenically unsaturated monomers are those that contain 0.1–15.0% by weight, based on the total weight of the polymer of alpha-olefinic monocarboxylic acid such as acrylic acid, methacrylic acid, ethacrylic acid, phenylacrylic acid.

Particularly preferred monomers used in making the polymers of unsaturated monomers include (1) nitriles of acids selected from acrylic acid, methacrylic acid, ethacrylic acid or a mixture thereof, and especially acrylonitrile; (2) α-olefinic monocarboxylic acid such as acrylic acid, methacrylic acid, ethacrylic acid and phenylacrylic acid and (3) ester of at least one α-olefinic monocarboxylic acid with at least one saturated aliphatic monohydric alcohol of 1–8 carbon atoms.

Desirable polymers formed from unsaturated monomers are those made from (A) at least one monomer selected from the group consisting essentially of acrylonitrile and methacrylonitrile, (B) at least one alpha-olefinic monocarboxylic acid, and (C) at least one monomer that is an ester of an alpha olefinic monocarboxylic acid with a saturated aliphatic monohydric alcohol of 1 to 8 carbon atoms.

Preferred polymers formed from unsaturated monomers are the desirable polymers wherein (A) is 10–80%, (B) is 0.1–15% and (C) is 9.5–89.9%; especially preferred polymers are those wherein (A) is 30–70%, (B) is 2–15% and (C) is 28–68%; most especially preferred polymers are those wherein (A) is 40–65%, (B) is 2–10% and (C) is 33–58% (the foregoing percentages being percent by weight based on the total weight of the polymer).

Other preferred polymers formed from unsaturated monomers are described in Sanderson U.S. Pat. No. 3,032,521, issued May 1, 1962, the disclosure of which is hereby incorporated by reference.

The polymers formed from unsaturated monomers are formed by any suitable method. A preferred method is emulsion polymerization in an aqueous medium. A suitable process for making the polymers by emulsion polymerization is described in the aforementioned U.S. Pat. No. 3,032,521. In such process conventional polymerization initiators can be used such as inorganic peroxides, salts of inorganic peroxides, azonitrile compounds, and redox (reduction/oxidation) compounds. Preferred are redox initiators such as sodium bisulfite and potassium persulfite in a weight ratio respectively of 1:1 to 1:10. In the emulsion polymerization system, preferably a dispering agent (such as sodium lauryl sulfate) in the normal amounts (often between about 0.25% and 4% based on the weight of monomers) can be used.

To produce the polymer of unsaturated monomers by an emulsion polymerization system, the monomers, polymerization initiator, dispersing agent (if used) and suitable reaction media such as water are charged into a suitable reaction vessel. The reaction mixture is then brought to a suitable reaction temperature which is maintained until the reaction is complete. Generally, the temperature can be about 25°–200°C. for about ¼ to 24 hours.

In the preferred method of polymerization in an aqueous media, water is added to the reaction vessel followed by deoxygenization by refluxing for about 15 minutes under an atmosphere of nitrogen. Then the dispersing agent is added to the deoxygenated water followed by the addition of sodium bisulfite, monomers and potassium persulfate. The reaction mixture is then maintained at a suitable temperature for a sufficient time to cause polymerization. The temperature can be from about room temperature to about the reflux temperature of the mixture for a time of about ¼ to 24 hours. Preferably, the reaction mixture will be maintained at about 110°–180°C., most preferably about 140°C., for about 2 hours. Preferably, during the reaction, an inert atmosphere such as nitrogen is maintained over the reaction mixture.

Suitable polyamic acids are salts of the polyamic acids described in Edwards U.S. Pat. No. 3,179,614 the disclosure of which is hereby incorporated by reference.

Thermosetting Resin

If desired, a thermosetting resin can be used with the above-described polymers. Thermosetting resins include condensates of phenol compound with aldehyde compound, melamine with aldehyde compound, urea with aldehyde compound, or benzoguanamine with aldehyde compound. Suitable phenol compounds include phenol, substituted phenols such as cresols, xylenols, resorcinols, naphthols, and, more specifically, 2:4 dimethylol phenol, 2:4:6 trimethylol phenol and 3 methyl:2:6-dimethylol phenol. Suitable aldehyde compounds include formaldehyde, acetaldehyde, and furfural. Examples of specific thermosetting resins include phenol-formaldehyde resin, alkylated melamine formaldehyde resins such as partially methylolated or butylated melamine formaldehyde resins, and wholly alkylated melamine formaldehyde resins such as, for example, hexamethoxymethylol melamine. Preferred is phenolformaldehyde resin.

Thermosetting resins include also aliphatic or aromatic polyisocyanates including:
4,4',4''-triisocyanato triphenyl methane
1,3,5-triisocyanato benzene
2,4,6-triisocyanato toluene, and the like
biurets of diisocyanates such as the trimerization product of hexane-1,6-diisocyanate of the formula:

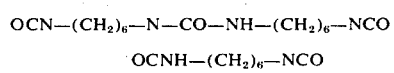

tolyl-2,4,6-triisocyanate
naphthalene-1,3,7-triisocyanate
diphenylmethane-2,4,4'-triisocyanate
triphenylmethane triisocyanate
adduct of one or more diisocyanates with one or more polyols containing about 3 to about 6 hydroxyl groups (such as propane, 1,2,6-hexane triol, trimethylolpropane, pentaerythritol, sorbitol, and the like) to obtain a crosslinker having a functionality of greater than 2 but no greater than about 8.

A preferred polyisocyanate is the adduct of aromatic diisocyanates with trimethylopropane such as the adduct of toluene-2,4-diisocyanate, toluene-2,6-diisocyanate or mixtures thereof with trimethylolpropane.

The diisocyanates for use in forming the polyisocyanates can be aliphatic or aromatic. Suitable diisocyanates include:
hexane-1,6-diisocyanate
decane-1,10-diisocyanate
diisocyanates derived from dimerized fatty acids
phenylene-1,4-diisocyanate
toluene-2,6-diisocyanate
naphthylene-1,5-diisocyanate
diphenylmethane-4,4'-diisocyanate
diphenylmethane-3,3'-dimethoxy-4,4'-diisocyanate
dicyclohexylmethane-4,4'-diisocyanate, etc.

Preferred is toluene 2,4-diisocyanate, toluene 2,6-diisocyanate or mixtures thereof.

Often the polyisocyanate will be blocked with a suitable compound such as phenol, cresylic acid, or methyl ethyl ketoxine so that the polyisocyanate will be ordinarily nonreactive at room temperature but will react at higher temperatures such as during baking of electrophoretically coated polymer.

The thermosetting resin has an average functionality greater than 2. At the present time, no reason is seen to use a thermosetting resin having an average functionality greater than about 8. Often the thermosetting resin will have an average functionality of about 4–6 and, more preferably, about 4–5, and most preferably, about 4.

The thermosetting resin can be present in the following percentages based on the combined weight of the thermosetting resin and the polymer of ethylenically unsaturated monomers: Generally 0.5–80.0%, preferably 5–80%, more preferably 10–70%, and most preferably about 30–50%.

Perfluoroolefin Polymer

If desired, the compositions of this invention can contain about 0.5–30.0% by weight, preferably about 5–10% by weight of polymer of a perfluoroolefin polymer such as tetrafluoroethylene (TFE) or copolymer of hexafluoropropylene (HFP) and tetrafluoroethylene or mixtures thereof. The foregoing weight per cents are based on the total weight of the film-forming polymer in the composition, i.e., polymer of ethylenically unsaturated monomer, thermosetting nitrogen resin (if used), and polymer of TFE, copolymer of TFE/HEP, or mixtures thereof.

The PTFE used in this invention is described in U.S. Pat. No. 2,230,654, the disclosure of which is hereby incorporated by reference.

The TFE/HFP copolymers used in this invention can have weight ratios of 5–95/5–95. The preferred copolymers, because of the stability of the dispersions formed with them, are the 50–95/5–50 TFE/HFP copolymers. Even more preferred are the 75–95/5–25 TFE/HFP copolymers. Most preferred are the 93–95/5–7, the 84–88/12–16, and the 75–80/20–25 copolymers, specifically the 95/5, 85/15, and 75/25 copolymers. The 1–5/95–99 copolymers can also be used, as can those whose TFE/HFP monomer ratios range from 95–100-/0–5.

Methods for preparing such copolymers are described in U.S. Pat. No. 2,946,763 to M. I. Bro et al., the disclosure of which is hereby incorporated by reference.

Organic Liquid

Preferably, the organic liquid will be one that will cause the polymer to form a limiting film in the electrophoretic process. To determine whether an organic liquid will cause a polymer to form a limiting film, one merely uses that organic liquid in conjunction with the desired polymer and water to make up the electrophoretic bath and then observes whether a limiting film is formed. As is known by those skilled in the art, a limiting film formed by an electrophoretic process means that after a layer of certain thickness of polymer is deposited on the electrode workpiece, no more polymer will be deposited or deposition will be at a much slower rate than initially. This limiting film allows the electrode workpiece to be coated with a layer of polymer of substantially uniform thickness, even if the electrode is irregular in shape.

As another method of determining whether a limiting film is being formed, one can make a bath of an aqueous dispersion of polymer and organic liquid, and then use this bath for an electrophoretic process at constant voltage. A graph is made of the electrophoretic process with current plotted on the vertical axis and time plotted on the horizontal axis. Almost immediately after the voltage is applied, a maximum current will be obtained, after which the current will decrease with passage of time. Eventually, the graph will approach or reach a horizontal line. Thus, in general, after the maximum current has been obtained, the average slope of the graft will be negative with the slope eventually approaching or reaching zero.

Such a graph defines the formation of a limiting film. When maximum current has been reached, the polymer is being deposited at a maximum rate. Thereafter, as the current decreases, the polymer is being deposited at a slower rate. Finally, when the graph approaches or reaches a horizontal line, the polymer (a) is being deposited at an essentially constant, very much slower rate as compared to the initial rate of application or (b) the deposition of the polymer has essentially stopped.

Note, however, that in the actual electrophoretic process, one will allow the current to flow for sufficient time to obtain a deposited polymer film of the desired thickness. Thus, it is not necessary to allow sufficient time to pass to reach the point where the slope of the previously-described graph approaches or reaches zero.

Often the organic liquid will have a total solubility parameter of about 8.5–16.0, preferably 10–16, more preferably about 11–16, and most preferably about 12.5–16.0. The solubility parameter, or δ, is defined as $$\delta = \left(\frac{\Delta E}{V}\right)^{\frac{1}{2}}$$

wherein:
$E$ = the energy of vaporization to a gas at zero pressure;
$V$ = the molal volume of the liquid.

Methods of determining solubility parameters are known and are set forth, for example, in *Polymer Handbook*, edited by J. Bandrup and E. H. Immergut, N.Y. Interscience, Vol. 4, 1966, p. 341–346 and Burrell, H., *Solubility Parameters* in Interchemical Review, p. 3–16, Spring, 1955.

The total solubility parameter of a mixture of more than one organic liquid is equal to $$\begin{pmatrix}\text{volume} \\ \text{fraction} \\ \text{organic} \\ \text{liquid}_1\end{pmatrix} \begin{pmatrix}\delta \text{ organic} \\ \text{liquid}_1\end{pmatrix} + \begin{pmatrix}\text{volume} \\ \text{fraction} \\ \text{organic} \\ \text{liquid}_2\end{pmatrix} \begin{pmatrix}\delta \text{ organic} \\ \text{liquid}_2\end{pmatrix} + \begin{pmatrix}\text{volume} \\ \text{fraction} \\ \text{organic} \\ \text{liquid}_i\end{pmatrix} \begin{pmatrix}\delta \text{ organic} \\ \text{liquid}_i\end{pmatrix} + \ldots$$

Of course, the total solubility parameter of a single organic liquid is the solubility parameter of that organic liquid.

If desired, one can use small amounts of organic liquids that have a solubility parameter that is outside the limits specified previously, provided that the other organic liquids used have such a solubility parameter and are present in such an amount that the overall solubility parameter of the organic liquid blend is within the limits specified previously.

Suitable organic liquids include butyrolactone, N-methylpyrrolidone, tetrahydrofuran, methyl ethyl ketone, methyl isobutyl ketone, phenol, cresol, butyl cellosolve acetate, cellosolve acetate, tetramethylene sulfone, cyclic ethylene carbonate, dimethylformamide, dimethyl acetamide, alkyl monoethers of ethylene glycol or diethylene glycol, diacetone alcohol, acetone, acetonitrile, benzyl alcohol, n-butyl alcohol, cyclohexanol, ethylene glycol, propylene glycol, ethyl formamide, methyl alcohol, diethyl formamide, propylene carbonate, propiolactone, dimethyl sulfoxide, ethyl alcohol, dipropyl sulfone, aniline, etc., or mixtures thereof. Preferred are butyrolactone, N-methylpyrrolidone, or mixtures thereof.

A preferred solvent mixture is the following: 4–31% ethylene glycol monoethyl ether, 21–51% ethylene glycol monobutyl ether acetate, 21–51% propylene glycol and 4–10% xylene. In the foregoing, the percentages are by weight, based on the total weight of the composition.

Preferably, the organic liquid will be present in an amount that is sufficient to cause a limiting film of the electrophoretically deposited polymer to be formed. Often the organic liquid will be present in a ratio of weight of organnic liquid to sum of the weight of polymer plus weight of thermosetting resin (if used) of at least about 1.0:1.0, preferably at least 1.5:1.0, more preferably, at least 2.0:1.0, and most preferably at least about 2.3:1.0. At the present time, no benefit is seen in using a ratio of greater than about 50:1, although ordinarily the organic liquid will be present in a ratio of no greater than about 13.0:1.0, preferably no greater than 12.0:1.0, more preferably no greater than about 10.0:1.0, and most preferably no more than about 8.0:1.0.

It is preferable that the organic liquid have a solvency such that it will at least swell the polymer that is being deposited by the electrophoretic process. However, if desired, the organic liquid can be a true solvent for the polymer. A suitable method for testing the solvency of the organic liquid is to place a drop of it on a sheet of the polymer that will be used in the electrophortetic process. If the drop of organic liquid swells the polymer, or if it solvates the polymer, it is suitable. However, if the organic liquid is such a weak solvent for the polymer that substantially no swelling or solvation of the polymer is produced, the organic liquid is not suitable.

Other Matters

Ordinarily, the above-described amount of organic liquid will be suitable for use in electrophoretic baths containing water in the amounts that are ordinarily used. As a further guide, without meaning to be limiting because organic liquids can function acceptably over wide ranges of amounts of water, the weight ratio of organic liquid to water often will be about 0.2–6.0:1.0, preferably 1–5:1, more preferably about 2–4:1, and most preferably about 2.5–4.5:1.

Ordinarily, the coating compositions of this invention will have a pH of about 2 to about 10, preferably about 4–8, and most preferably about 5–7.

The composition of this invention can contain pigment in a pigment volume concentration up to about 30%; preferably, pigment volume concentrations of about 1–15% are used. The pigment volume concentration is the ratio expressed on a percent basis of the volume of pigment to the total volume of pigment plus film-forming materials of the composition; the volume of pigment is the volume of vehicle displaced by the pigment wet with vehicle. Suitable pigments include titanium dioxide, iron oxide, lead chromate, chromium oxide, phthalocyanines, carbon black, zinc oxide, magnesium oxide, antimony oxide, lithopone, zinc chromate, red lead, aluminum, zinc stearate, aluminum stearate, aluminum silicate, magnesium silicate, calcium sulfate, barium sulfate, silicon dioxide, potassium aluminum silicate, calcium carbonate, magnesium silicate, calcium silicate, amorphous silica, and the like.

The electrode that is being coated with polymer in the electrophoretic process is maintained at a temperature at least above that of the electrophoretic bath for a time that is sufficient to produce a polymer film coating the electrode that after baking, at a temperature and for a time that is sufficient to harden the film, has a greater resistivity than a film that is coated under the same conditions with the exception that an elevated temperature is not maintained.

Maintaining the electrode at the elevated temperature can be by any suitable means. One suitable means is to heat the electrode while it is immersed in the electrophoretic bath. This heating can be done (1) before, (2) during, (3) before and during, or (4) before, during and after the electrophoretic deposition of polymer as long as a suitable elevated temperature is maintained for a sufficient time during the electrophoretic deposition of polymer to obtain the desired results. Heating the electrode while it is immersed in the electrophoretic bath can be by any suitable means including electrical resistance heating and electrical induction heating. With electrical resistance heating, electrical current, alternating or direct, having an appropriate voltage and amperage to produce the desired temperature rise, is passed through the electrode.

Another method of maintaining the electrode at the desired temperature during the electrophoretic process is prior heating, that is, heating the electrode by any suitable means prior to its immersion in the electrophoretic bath and then immersing the heated electrode in the electrophoretic bath. If the electrode has a sufficient mass and has been heated sufficiently, it will still be at an elevated temperature during the electrophoretic process. In a similar manner, the electrode and/or a mass of material in close proximity to the electrode can be heated prior to immersion in the electrophoretic bath and then both the electrode and the mass of material can be immersed in the electrophoretic bath. For example, aluminum wire, which is the electrode, can be wound around an insulated metal bar. Then the bar and wire can be heated followed by immersion in the electrophoretic bath and application of the electrophoretic process. The prior heating can be by any suitable means such as heating in an oven, infrared heating, induction heating, electrical resistance heating, microwave heating, etc. Of course, if desired, prior heating can be used in addition to heating by other means while the electrode is immersed in the electrophoretic bath.

The duration of the heating during the electrophoretic process can vary depending on many factors such as the desired temperature to which the electrode is heated, the desired film build, the rate at which the polymer is deposited on the electrode, etc. Often the duration of heating will be about 1 second to 5 hours, preferably 5 seconds to 3 hours and most preferably 5 seconds to 1 hours.

The elevated temperature at which the electrode is maintained during the electrophoretic process can vary depending upon the duration of the heating, the desired film build, the rate of deposition of the polymer, etc. Often, during the electrophoretic process, the electrode will be maintained at a temperature of at least 1°, preferably at least 2°, more preferably at least 3°, even more preferably at least 4° and most preferably at least 5°C. above the temperature of the electrophoretic bath. The upper temperature of the electrode can be 20°C., 40°C. and even up to the boiling temperature of the electrophoretic bath, so long as the elevated temperature does not cause a substantial decomposition of the bath or any of its ingredients.

Preferably, while the electrode is at an elevated temperature in the electrophoretic bath, the bath will be agitated. It has been found that this agitation can improve the uniformity of the deposition of the polymer by the electrophoretic process. Preferably, the agitation will be sufficient to maintain a substantially uniform temperature throughout the bath. The agitation can be by any suitable means such as stirring, agitation with an impellor, etc.

Preferably, the temperature of the electrophoretic bath will not be allowed to rise to a high enough temperature that a substantial decomposition, gelling or cross-linking occurs. Often, for many compositions, suitable temperatures for the electrophoretic bath are 33°–90°F. and preferably 40°–80°F.

Electrode

The electrode used in the process of this invention can be any material that is capable of having polymer deposited upon it in an electrophoretic process. Suitable materials include metals, such as aluminum, aluminum alloys, copper, copper alloys, silver, silver alloys, gold, gold alloys, iron, iron alloys, etc. Preferred metals are those that evolve gas during the electrophoretic process such as aluminum or aluminum alloys.

If desired, the electrode can be a material, such as metal, that has been coated previously with a suitable film. Such coating often will have imperfections (such as holes, cuts, scratches, etc.) in it and by using the process of the present invention, such imperfections can be covered over. It has been found that the process of the present invention is especially suited for such patching operations since the process appears to produce patches that excellently cover and flow out over and into the imperfections that may exist in the film that is already covering the electrode. The film that is already covering the electrode can be any material such as polymer including polyimide, polyamide, polyester, polymer of unsaturated monomers, polyurethane, polyester amide, etc. This film can be deposited by any suitable method such as electrodeposition, hot melt extrusion, painting, immersion, etc.

The electrode that is patched in accordance with the procedure described above, can be in any suitable form. For example, it can be wire in round, strip or foil shapes, bars, cylinders, etc. Also, the electrode can be already in an assembled form. For example, the stator of an electric motor can be wound with wire that has been coated previously with some insulation such as wire enamel. Then, the process of the present invention can be used to electrodeposit polymer onto the wire that has already been wound onto the stator of the motor. Such process will deposit polymer in the areas where cracks and imprefections exist in the insulation which covers the wire on the stator. Such cracks and imperfections often develop in the process of winding the wire onto the stator.

Preferably, before the electrode is used in the process of this invention, it will be cleaned to remove any contaminants from it. This cleaning can be by any suitable means such as subjecting the electrode to a vapor such as steam or vaporized organic liquid or immersion in a liquid that will dissolve and/or wash away the contaminants. Suitable liquids include organic liquids such as those mentioned previously and water. Preferred organic liquids include methylene chloride and monohydric $C_1$–$C_4$ alcohols such as methanol, ethanol, propanol, isopropanol, butanol, and blends thereof. If desired, the immersion in the liquid can be used in conjunction with an ultrasonic device that acts upon the liquid and the electrode that is immersed in the liquid to thereby aid in dislodging contaminants that are adhering to the electrode.

The cleaning of the electrode prior to its use in the process of this invention is especially useful when the electrode has been covered previously with a film of polymer and it is desired to patch imperfections in the film. And, this is especially so when the electrode having a film of polymer covering it is tested for imperfections by passing a high voltage through it. Such high voltage will locate the imperfections so that one can determine which electrodes or parts of such electrodes can advantageously be repaired by the process of this invention. However, such high voltage often will leave carbon deposits at the place of the imperfection due to voltage leaks which may cause some of the polymer film that is coating the electrode to decompose. These carbon deposits can interfere with the acceptable deposition of polymer and therefore for best results, they should be removed prior to using the process of this invention. It has been found that an especially good method for removing such carbon deposits is to clean the carbon deposited electrode by immersing it in an organic liquid, such as a blend of methylene chloride and a $C_1$–$C_4$ monohydric alcohol, and using an ultrasonic device to act upon the organic liquid and the electrode to thereby aid in removing the carbon deposits.

The following examples illustrate the invention. All parts and percentages are by weight unless otherwise indicated.

EXAMPLE 1

An electrophoretic bath was made by admixing the following:

a. 13.6 parts acrylic polymer dispersion. (The polymer consisted of 63% acrylonitrile, 32% butyl acrylate, and 5% methacrylic acid. The polymer was made by emulsion polymerization using the procedure described in U.S. Pat. No. 3,032,521, had a molecular weight of about 1–2 million, a glass transition point of about 45°C., and was water insoluble. The polymer existed as a dispersion of fine particles in water; the dispersion contained 33% solids), (b), 17.6 parts water, (c) 65.0 parts butyrolactone (solubility parameter of about 13.3), and (d) 3.8 parts phenolic resin ("Bakelite BRL-1100" phenol-formaldehyde resin, 65% solids, available from Union Carbide Corporation).

Aluminum wire of about 24 gauge (that is, about 0.02 inches in diameter) and about 10 inches long, was formed into a "U" shape. One end of the wire was connected to the positive terminal of a direct current source and also to one terminal of an alternating current source. The other end of the wire was connected to the other terminal of the alternating current source. The negative terminal of the direct current source was connected to a probe that was immersed in the electrophoretic bath.

The "U" shaped wire was then placed in the electrophoretic bath and heated by applying alternating current at about 10 amps and about 0.1 volts, for approximately 13 seconds. Then, while the resistance heating with the alternating current was continued, direct current at about 75 volts and 0.2 amps was passed through the wire for about 14 seconds which caused electrophoretic deposition of the polymer on the wire. The resistance heating continued for about 1.5 minutes after the electrophoretic deposition of the polymer.

During the electrical resistance heating, the bath was stirred with a magnetic stirrer and the bath temperature was maintained at about 70°–80°F. by a water jacket.

The thickness of the polymer film deposited by the electrophoretic process was about 0.002 inches.

The wire was then baked for 45 minutes at 150°C. The resulting film on the wire was found to be substantially coalesced, continuous, non-blistered and non-cracked. Furthermore, the wire had 3–4 times greater resistivity than a control wire that was electrocoated under the same conditions with the exception that no heating was used during the electrophoretic deposition of the polymer.

EXAMPLE 2

A 15 inch piece of 17 gauge aluminum wire previously coated with acrylic wire enamel in a thickness of about 3.1 mils was connected as described in Example 1 with the exception that the wire was formed into five coils of about 0.63 inch in diameter with a straight piece left at each end for the hook-up. A scrape was made on each coil with a sharp instrument which completely removed the acrylic wire enamel down to the bare aluminum. the scrape was about 3/16 × 1/16 inch and was made to simulate damage to the acrylic wire enamel.

The coiled wire was immersed in an electrophoretic bath which was cooled and agitated as described in Example 1. The bath had the following composition (all percentages by weight based on total weight of the composition): ethylene glycol monoethyl ether 11%, ethylene glycol monobutyl ether 16%, propylene glycol 16.6%, polymer of Example 1 20% and water 31.4%.

The coil was heated by passing alternating current, at about 25 amps and about 0.2 volts, through the wire for about 15 seconds. Then, while the resistance heating with alternating current was continued, direct current at about 75 volts and 15 miliamps was passed through the wire for about 15 seconds which caused electrophoretic deposition of the polymer on the wire. The resistance heating with alternating current was continued for about 38 seconds after the direct current was cut off.

The wire was then removed from the electrophoretic bath and baked in an oven for 15 minutes at 100°C. followed by a bake of 45 minutes at 150°C.

The repaired areas of the coil were smooth, well coalesced and bubble free. More than 85% of all of the repaired areas were able to withstand 2,700 volts before leakage occurred. In contrast to this, when a control sample was made using the same conditions of electrodeposition with the exception that no heating was done during the electrophoretic deposition of polymer, it was found that most of the repaired areas exhibited resistivity or less than 1,200 volts.

EXAMPLE 3

The same conditions and procedure described in Example 2 were used to repair aluminum wire that had been coated with a first layer of polyester and a second layer of polyamide. As described in Example 2, scrapes were made in the coated aluminum wire to simulate damage to it.

The repaired areas had no bubbles and were smooth and well coalesced. At least 89% of the repaired areas were able to withstand 2,000 volts before leakage occurred.

In contrast to the above, when the same test was made without any internal resistance heating, it was found that the repaired areas were rough, blistered and had many pitted areas. At least 60% of the patched areas exhibited leakage at 2,000 volts.

EXAMPLE 4

A solid iron cylinder 3½ inches long and ¾ inches in diameter was wound with about 18 feet of 17 gauge aluminum wire that had been coated previously with acrylic wire enamel. Scrapes similar to those described in Example 2 were made in the enamel to simulate damage to it.

The iron core having the aluminum wire wound on its was then placed for about 10 minutes in an oven that had been heated to 150°C. The assembly was then removed from the oven, and while it was still hot, immersed in the electrophoretic bath described in Example 2. Next, the acrylic wire was patched using the procedure described in Example 2 with the exception that no resistance heating was used and the deposition was accomplished by passing direct current, at about 75 volts and 15 miliamps, through the wire for about 15 seconds.

After the electrodeposition, the entire assembly was removed and baked in an oven using the conditions described in Example 2.

It was found that the damaged areas of the acrylic coated aluminun wire were well covered and were smooth, well coalesced and essentially bubble free and had excellent resistivity. In contrast to this, when the same type of assembly was electrocoated using the same conditions with the exception that the assembly was not preheated, it was found that the patched areas were rough, blistered, had many pitted areas and had less resistivity as compared to the patched areas in the assembly that was heated prior to electrodeposition.

The invention claimed is:
1. In the process of coating, by electrophoretic process, a film-forming polymer on an electrode, wherein the electrode is aluminum or an aluminum alloy, and using in the process, a composition that comprises a continuous phase containing polymer, the improvement comprising:
  a. using a polymer that
    1. has a glass transition temperature of at least 25°C.,
    2. is ccapable of being coated onto a suitable substrate by electrophoretic process,
    3. is selected from the group consisting essentially of polymer formed from unsaturated monomers, polyesters, polyurethanes, polyamides polyesterimides, polyamic acids, polyamide-imides, epox- ies and mixtures of the foregoing and
4. has a molecular weight of at least about 100,100,
b. using a continuous phase comprising water and at least one organic liquid, said organic liquid
1. having a solubility parameter of about 8.5 to 16,
2. having such solvency that it will at least swell the polymer described in (a), and
3. being present in an amount of about 1–13 parts by weight organic liquid per part by weight of polymer, and
c. maintaining the electrode that is being coated with a polymer at a temperature at least above that of the continuous phase for a time that is sufficient to produce a polymer film coating the electrode, that after baking at a temperature and for a time that is sufficient to harden the film, has a greater resistivity than a polymer film that is coated under the same conditions with the exception that an elevated temperature is not maintained and whereby the polymer film is substantially free of cracks and blisters caused by evolution of gas at the electrode.

2. The process of claim 1 wherein the electrode is metal that has been coated previously with a film of polymer.

3. The process of claim 1 wherein the elevated temperature of the electrode is maintained by means selected from electrical resistance heating, electrical induction heating, microwave heating, infra-red heating or combinations thereof.

4. The process of claim 1 wherein the electrode is wire that has been coated previously with a film of polymer.

5. The process of claim 1 wherein the composition used in the electrophoretic process is agitated sufficiently during the maintenance of the elevated temperature that a substantially uniform temperature is maintained throughout such composition.

6. The process of claim 1 wherein the organic liquid is a mixture of 4–31% ethylene glycol monoethyl ether, 21–51% ethylene glycol monobutyl ether acetate, 21–51% propylene glycol and 4–10% xylene, the foregoing percentages being by weight based on the total weight of all of the organic liquids.

7. The process of claim 1 wherein prior to electrodeposition the electrode is cleaned to remove any contaminants.

8. The process of claim 7 wherein the cleaning is done by immersion of the electrode in a bath of organic liquid that has ultra-sonic sound waves acting upon it.

9. The process of claim 1 wherein during the electrophoretic deposition of polymer the electrode is maintained at a temperature of at least about 1°C. above that of the temperature of the electrophoretic bath for a duration of about 1 second to 5 hours.

10. The process of claim 9 wherein the electrode is maintained at a temperature of at least about 2°C. above that of the electrophoretic bath.

11. The process of claim 10 wherein the electrode is wire coated with a film of polymer that is part of a stator of an electric motor.

12. The process of claim 10 wherein prior to electrodeposition the electrode is cleaned to remove any contaminants.

13. The process of claim 1 wherein the polymer is formed from unsaturated monomers.

14. The process of claim 13 wherein the polymer is formed from 0.14–15.0% by weight, based on the total weight of the polymer, of a-olefinic monocarboxylic acid.

15. The process of claim 14 containing thermosetting resin selected from the group consisting of condensate of phenol compound with aldehyde compound, melamine with aldehyde compound, urea with aldehyde compound or benzoquanamine with aldehyde compound in an amount of about 0.5–80% by weight based on the combined weight of the thermosetting resin and polymer.

16. The process of claim 15 wherein during the electrophoretic deposition of polymer the electrode is maintained at a temperature of at least about 1°C. above that of the electrophoretic bath for a duration of about 1 second to about 5 hours.

17. The process of claim 16 wherein the electrode is metal that has been coated previously with a film of polymer.

18. The process of claim 13 wherein the polymer is formed from (A) 10–80% of at least one monomer selected from the group consisting essentially of acrylonitrile and methacrylonitrile, (B) 0.1–15% of at least one a-olefinic monocarboxylic acid and (C) 9.5–89.9% of at least one monomer that is an ester of an a-olefinic mono-carboxylic acid with a saturated aliphatic monohydric alcohol of 1 to 8 carbon atoms, the foregoing percentages being by weight based on the total weight of the polymer.

19. The process of claim 18 wherein (A) is 30–70%, (B) is 2–15%, and (C) is 29–68%.

20. The process of claim 18 wherein (A) is 40–65%, (B) is 2–10%, and (C) is 33–58%.

21. The process of claim 18 wherein the composition used in the electrophoretic process is agitated sufficiently during the maintenance of the elevated temperature that a substantially uniform temperature is maintained throughout such composition.

22. The process of claim 18 containing thermosetting resin selected from the group consisting of condensate of phenol compound with aldehyde compound or benzoguanamine with aldehyde compound in an amount of about 0.5–80% by weight based on the combined weight of the thermosetting resin and polymer.

23. The process of claim 22 wherein the composition used in the electrophoretic process is agitated sufficiently during the maintenance of the elevated temperature that a substantially uniform temperature is maintained throughout such composition.

24. The process of claim 23 wherein during the electrophoretic deposition of polymer the electrode is maintained at a temperature of at least about 1°C. above that of the electrophoretic bath for a duration of about 1 second to about 5 hours and the polymer has a molecular weight of about 100,000.

* * * * *